United States Patent
Venolia et al.

(10) Patent No.: US 7,634,454 B2
(45) Date of Patent: Dec. 15, 2009

(54) CONCEPT KEYWORDS COLORIZATION IN PROGRAM IDENTIFIERS

(75) Inventors: Gina Danielle Venolia, Bellevue, WA (US); Andrew Brian Begel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 11/562,348

(22) Filed: Nov. 21, 2006

(65) Prior Publication Data

US 2008/0120269 A1    May 22, 2008

(51) Int. Cl.
   *G06F 9/44*    (2006.01)
(52) U.S. Cl. .............................. 707/1; 341/23; 341/29; 341/67; 717/105; 717/143
(58) Field of Classification Search ............... 707/8, 707/101, 1, 10, 100; 717/105, 109, 136, 717/143; 341/23, 29, 67
   See application file for complete search history.

(56) References Cited

U.S. PATENT DOCUMENTS

| | | | | |
|---|---|---|---|---|
| 4,617,643 A * | 10/1986 | Klock et al. | ................. | 715/273 |
| 6,102,966 A * | 8/2000 | Tyma | .......................... | 717/110 |
| 7,133,993 B1 * | 11/2006 | Jackson et al. | .............. | 711/172 |
| 2002/0095657 A1 * | 7/2002 | Vaidyanathan et al. | ...... | 717/110 |
| 2004/0031024 A1 * | 2/2004 | Fairweather | ................. | 717/143 |
| 2004/0254942 A1 * | 12/2004 | Error et al. | ................... | 707/100 |
| 2007/0101252 A1 * | 5/2007 | Chamberlain et al. | ....... | 715/503 |

* cited by examiner

*Primary Examiner*—Tim T Vo
*Assistant Examiner*—Bao G Tran
(74) *Attorney, Agent, or Firm*—Workman Nydegger (57) ABSTRACT

In one embodiment of this invention, a computer system performs a method for colorizing concept keywords within program identifiers in source code. A computer system decomposes each identifier in the source code into one or more concept keywords The computer system determines a numerical value for each concept keyword based on the sequence of characters included in each concept keyword. The computer system assigns a color to each concept keyword based on the numerical value determined for each concept keyword.

13 Claims, 6 Drawing Sheets

```
/// <summary>
/// Adds any SQL parameter definitions to the list
/// </summary>
/// <param name="definitions"> The list of definitions </param>
internal protected virtual void AddSQLParameterDefinitions(List<string> definitions) {
        if(definitions == null) {
                throw new ArgumentNullException("definitions");
        }

Validate();
}
```

```
                              (Rose) 302      303 (Green)
              (Orange) 301                       304 (Beige)           304 (Beige)
              Blue                               Cyan Blue
     internal protected virtual void AddSQLParameterDefinitions(List<string> definitions) {
              if(definitions == null) {   Blue
        Blue              throw new ArgumentNullException("definitions");
     (Beige) 304   }       Blue                              205 String (Red)
                     (Crimson) 305         307 (Magenta)
              Validate();              306 (Sepia)
              308 (Teal)
```

*Fig. 3*

```
   401 (Green)  402    403 (Red)         404 (Orange)
                (Blue)
   abstract alias anchor annotation
   405 (Beige)   406 (Cyan)    407 (Taupe)  408 (Crimson)
   args change changed children clone
   409 (Teal)   410 (Violet) 411 (Magenta) 412 (Sepia) 413 (Rose) 414 (Viridian)
   contents creation data date delete depot
```

CONCEPT KEYWORDS COLORIZATION IN PROGRAM IDENTIFIERS

BACKGROUND

With the increased use of computers and software applications in today's society comes an increase in the number of methods and systems for developing such applications. Computers can be used to perform a wide variety of tasks based on the application being used. When a computer user inputs a command into a software program, the computer processes the inputs according to instructions within the software program's source code. In order to create a working software application, a program developer typically has to write source code not only for instructions on how to handle user inputs, but also to create the graphical user interface (GUI) and other elements of the program. Writing source code is often a lengthy and time-consuming process, and many software applications routinely take thousands or even hundreds of thousands of lines of code to complete.

Figure 1:
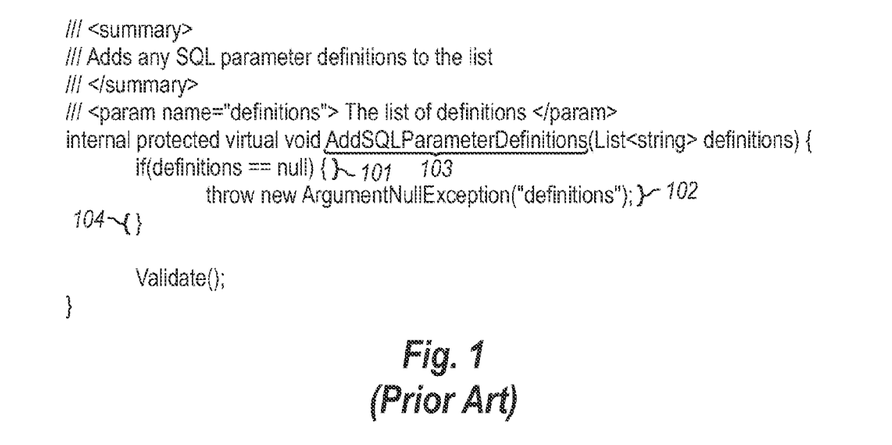
FIG. 1 (Prior Art) illustrates a method of using whitespace to enhance source code readability.

To simplify the code writing process, many software developers write code within an integrated development environment (IDE). Most modern IDE's have methods for organizing source code and making it more readable. Often this includes grouping or nesting certain terms and/or functions to make better use of whitespace. For example, in FIG. 1, the "if" statement 101 is indented so as to set it apart, indicating that "if" statement 101 is part of the function immediately above the "if" statement 101 (i.e. the "AddSQLParameterDefinitions" function 103). Similarly, the "throw" statement 102 within "if" statement 101 is also indented to show that "throw" statement 102 is a part of the "if" statement 101. Brackets (e.g. bracket 104) are given their own line, surrounded by whitespace, to signify the end of a loop or function. Tabbing and other indentation schemes have also been used to make source code more readable using whitespace.

Other methods include colorizing certain words and/or operators to set them apart from other text in the software code. For example, in many IDE's, comments will be displayed in one color, variables in another, strings in another, and so on. For instance, in FIG. 2, comment markups (e.g. comment markup 201) are colored gray, comments (e.g. comment 202) are colored green, function types (e.g. function type 203) are colored blue, function identifiers (e.g. function identifier 204) are colored violet and strings (e.g. string 205) are colored red. It should be noted that the colors used in the above example are arbitrary and may be changed by the IDE user. It is also possible to assign colors to other items within the IDE such as variables, entire functions, brackets (according to function), and more. However, in large programs, such a color scheme may be insufficient. In many cases, identifiers are not colorized, thus leaving the identifiers in the source code in their native color (usually black).

The names of functions or routines within the software code are called identifiers. As it is often the case that a developer is working on a team and will have his or her code reviewed by others, it is often very helpful (and is quite commonplace in most software code) to label the functions or routines with a descriptive identifier. For example, a function that stores user input to a certain location may look like the following: "StoreUserInput(location)". Thus, if another developer were to read through the source code desiring to know which routine accomplished a certain function, a descriptive identifier such as the one above would be quite beneficial.

Furthermore, the words used within a descriptive identifier may have meaning in other portions of the software aside from the function the identifier is used to identify. For instance, in the example above, a developer looking through the code may also be interested in other areas of the source code that deal with "Input". For example, some functions could receive the input while other functions could retrieve stored input, etc. Similarly, other functions may exist that use variant of the identifier. For instance, in the above example, the source code may contain functions with identifiers that use terms such as "Inputs", "Inputted" or "Inputting". In some cases it may be desirable to identify all such identifiers in the source code without systematically searching for each one using a search tool. Current methods lack the ability to provide an easily visible correlation between related words within identifiers.

BRIEF SUMMARY

Embodiments of the present invention are directed to systems and methods for colorizing concept keywords within program identifiers in source code. In one embodiment of this invention, a computer system performs a method for colorizing concept keywords within program identifiers in source code. A computer system decomposes each identifier in the source code into one or more concept keywords. The computer system determines a numerical value for each concept keyword based on the sequence of characters included in each concept keyword. The computer system assigns a color to each concept keyword based on the numerical value determined for each concept keyword.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to systems and methods for colorizing concept keywords within program identifiers in source code. In one embodiment of this invention, a computer system performs a method for colorizing concept keywords within program identifiers in source code. A computer system decomposes each identifier in the source code into one or more concept keywords. The computer system determines a numerical value for each concept keyword based on the sequence of characters included in each concept keyword. The computer system assigns a color to each concept keyword based on the numerical value determined for each concept keyword. The embodiments of the present invention may comprise a special purpose or general-purpose computer including various computer hardware, as discussed in greater detail below.

Embodiments within the scope of the present invention also include computer-readable media, including communication media for carrying or computer storage media for storing computer-executable instructions or data structures stored thereon. Such communication media and computer storage media can be any available media that can be accessed by a general purpose or special purpose computer. By way of example, and not limitation, such computer-storage media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Thus, any such connection is properly termed a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 3:
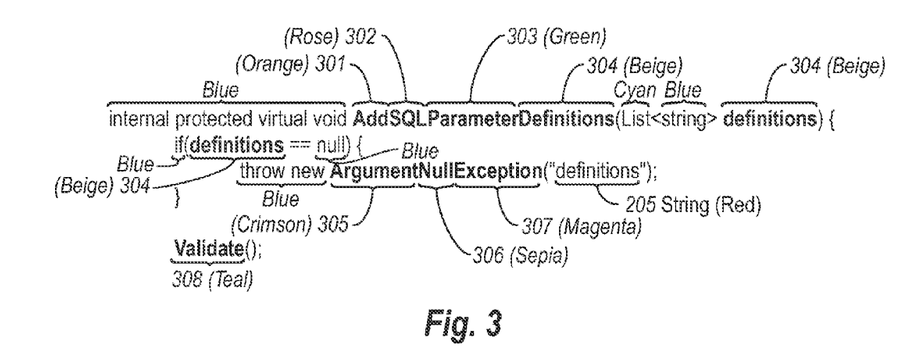
FIG. 3 illustrates an embodiment of the present invention in which concept keywords within identifiers have been colorized.

FIG. 3 illustrates an embodiment of the present invention in which concept keywords within identifiers have been colorized. For example, in FIG. 3, concept keywords have been identified within identifiers and have been colored as follows: concept keyword 301 is colored orange, concept keyword 302 is colored rose, concept keyword 303 is colored green, concept keyword 304 is colored beige, concept keyword 305 is colored crimson, concept keyword 306 is colored sepia, concept keyword 307 is colored magenta and concept keyword 308 is colored teal. In some embodiments, concept keywords that share a similar root form may be colored with the same or substantially similar colors. For example, concept keyword 304, "definitions" appears three times as an identifier; thus, in each case, concept keyword 304 is colored beige. Other words that share a similar root form with concept keyword 304, such as definitional, definitions, define, etc. may also be colored the same (beige in this embodiment). It should also be noted that in this embodiment a syntax coloring scheme is in place and may or may not take priority over an identifier concept keyword coloring scheme. In this embodiment, the syntax coloring scheme has taken priority over the identifier concept keyword coloring scheme; thus, "definitions" string 309 is colored red according to the syntax coloring scheme. Methods for coloring identifier concept keywords will be explained in greater detail below.

Figure 4:
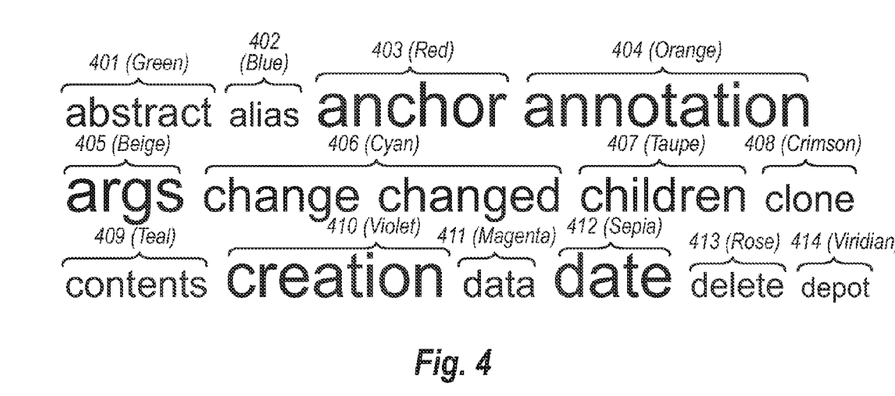
FIG. 4 illustrates an embodiment of the present invention in which concept keywords from the source code have been arranged alphabetically in a cloud form.

FIG. 4 illustrates an embodiment of the present invention in which concept keywords from the source code have been arranged alphabetically in a cloud form. In some embodiments, it may be beneficial to view a conglomeration of all concept keywords within the source code (or a selected portion thereof), arranged alphabetically, sized according to frequency of use in the source code and colored based on an identifier concept keyword coloring scheme. For example, concept keyword 401 may be colored green, concept keyword 402 may be colored blue, concept keyword 403 may be colored red, and so on (concept keywords 404-413) until the end of the cloud which, in this case, is concept keyword 414 colored viridian. In the embodiment illustrated in FIG. 4, the concept keywords with a larger font are used more often in the source code than the concept keywords than with smaller fonts. In some embodiments, font size may be directly proportional to the number of times the concept keyword appears in the (selected portion of) source code. As mentioned above, concept keywords with a similar root form may be colored with the same or a substantially similar color. This concept will be explained in greater detail below.

Figure 5:
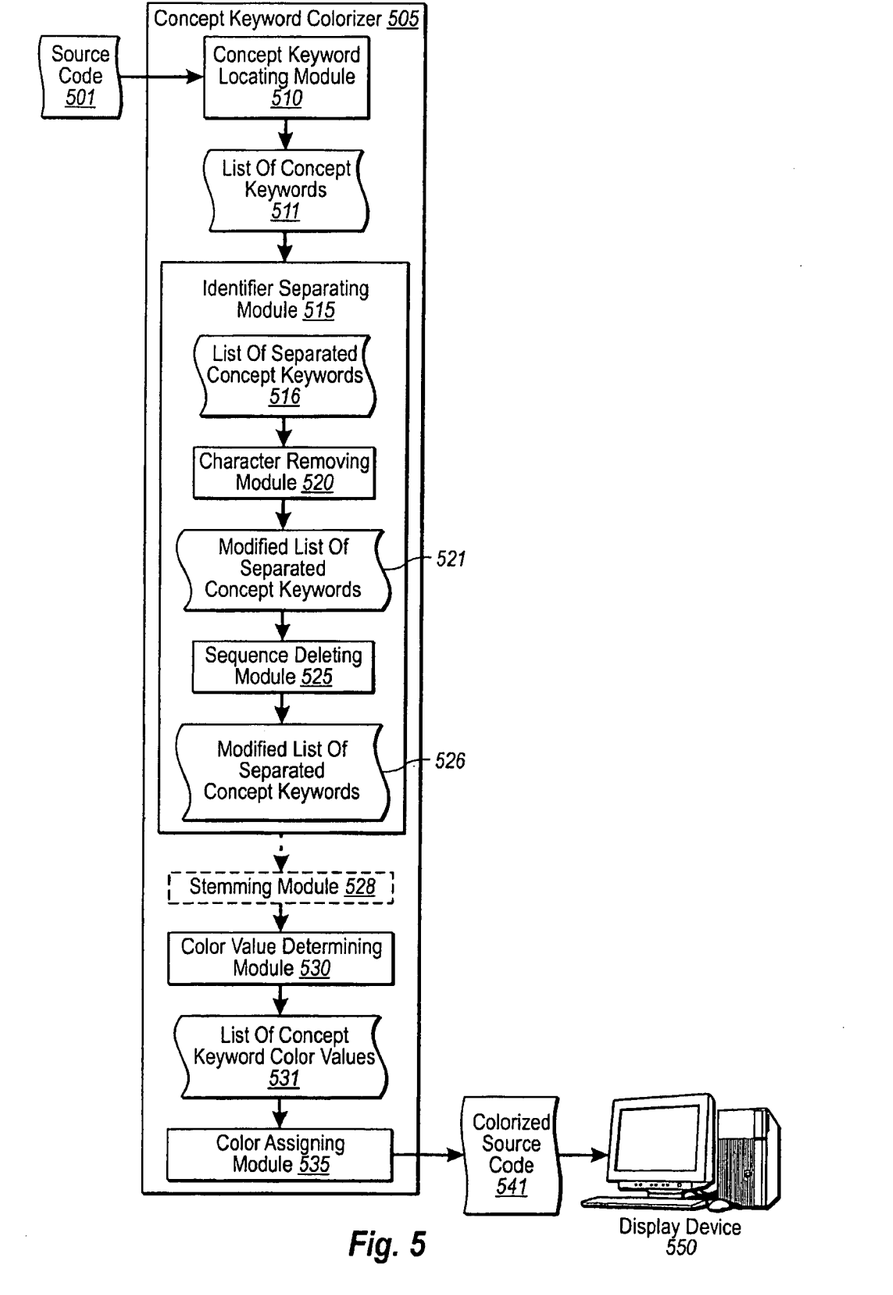
FIG. 5 illustrates a computing environment in which embodiments of the present invention may operate including colorizing concept keywords within program identifiers in source code.

FIG. 5 illustrates a computer architecture 500 in which the principles of the present invention may be employed. As depicted in computer architecture 500, concept keyword colorizer 505 may receive source code 501. Source code 501 can be any type of source code, written for any type of functionality, written in any programming or scripting language. Source code 501 can be an entire program comprising multiple functions, or may comprise merely a portion thereof (e.g. a single function or even a single line of code). Concept keyword colorizer 505 may include one or more modules used for processing source code 501.

In some embodiments, concept keyword colorizer 505 may include a concept keyword locating module 510. Concept keyword locating module 510 may be used to locate concept keywords within function identifiers in source code 501. Oftentimes, when writing source code, developers will use a string of words as the function identifier in an attempt to describe the gist of the function in the function identifier. That way, one reading through the code may more easily identify the broad purpose of the function without having to read through the function's code. Such strings of concatenated words may simply be a string of lower-case words (e.g. "storeuserinput"). Other forms of concatenation include using underscores between words (e.g. "store_user_input"), or setting apart the words with capital letters at the beginning of each word (e.g. "StoreUserInput"). Thus, in some embodiments, concept keyword locating module 510 may be capable of locating concept keywords in identifiers using any type of concatenation. Concept keyword locating module 510 may also be capable of forming a list of concept keywords 511 and passing list 511 to identifier separating module 515.

In some embodiments, concept keyword colorizer 505 may include an identifier separating module 515. Identifier separating module 515 may be configured to separate concatenated function identifiers. As explained above, identifier separating module 515 may be configured to separate identifiers with multiple concept keywords concatenated in variety of ways. For example, identifier separating module 515 may separate a function identifier into sequences of all lower-case, all upper-case, all numeric, and/or all punctuation characters (e.g., AddSQLParameterDefinitions becomes [A][dd][SQLP][arameter][D][efinitions]). Identifier separating module 515 may also be capable of forming a list of separated concept keywords 516 and passing list 516 to character removing module 520.

In some embodiments, concept keyword colorizer 505 may include character removing module 520. Character removing module 520 may be capable of adding and removing characters to and from character sequences. For example, for each all-capital sequence followed by an all-lower-case sequence, character removing module 520 may remove the last letter from the all-capital sequence and prepend the letter to the all-lower-case sequence (e.g. [ ][Add][SQL][Parameter][ ][Definitions]). Character removing module 520 may also be capable of forming a modified list of separated concept keywords 521 which includes the modified character sequence and passing list 521 to sequence deleting module 525.

In some embodiments, concept keyword colorizer 505 may include a sequence deleting module 525. Sequence deleting module 525 may be capable of removing any empty character sequences. Thus, continuing the example from above, empty sequences are deleted, resulting in e.g., [Add][SQL][Parameter][Definitions]. Sequence deleting module 525 may also be capable of forming a modified list of separated concept keywords 526 which includes the modified character sequence and passing modified list 526 to color value determining module 530.

In some embodiments, concept keyword colorizer 505 may include a color value determining module 530. Color value determining module 530 may be capable of receiving modified list of separated concept keywords 526 and converting each concept keyword into a numerical value. Methods for converting the concept keyword into a numerical value will be explained in greater detail below. Color value determining module 530 may also be capable of forming a list of concept keyword color values 531 and passing list 531 to color assigning module 535.

In some embodiments, concept keyword colorizer 505 may include a color assigning module 535. Color assigning module 535 may be capable of receiving a list of concept keyword color values (e.g. list 531) and assigning a color to each concept keyword based on the concept keyword's associated numerical value. For example, if a concept keyword had a numerical value of 0.71 and 0.71 was equivalent to blue in a given color scheme, color assigning module 535 would assign or colorize that concept keyword with the color blue. Color assigning module 535 may also be capable of sending colorized source code 541 to a display device 550. Display device 550 may be any type of display device including a computer monitor, television, projector, laptop display, printer or other means of displaying source code.

Figure 6A:
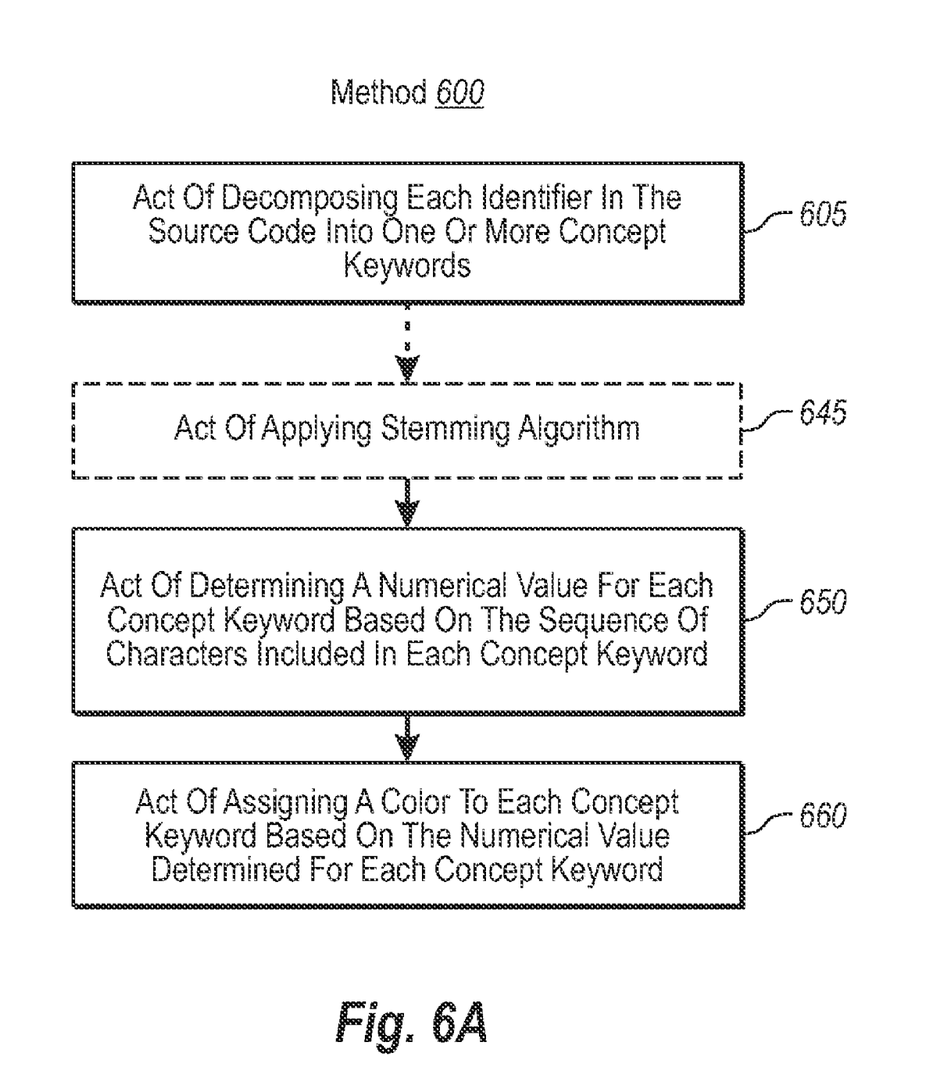
FIG. 6A illustrates a flowchart of an example method for colorizing concept keywords within program identifiers in source code.

FIG. 6A illustrates a flowchart of a method 600 for colorizing concept keywords within program identifiers in source code. As the method 600 may be performed in the context of the computer architecture 500 of FIG. 5, the method 600 of FIG. 6A will now be described with frequent reference to FIG. 5.

Method 600 includes an act of decomposing each identifier in the source code into one or more concept keywords (act 605). For example, concept keyword colorizer 505 may decompose each identifier in source code 501 into one or more concept keywords (e.g., list of concept keywords 511). Identifiers may be decomposed in a variety of ways. One example of how an identifier may be decomposed is illustrated in FIG. 6B.

Figure 2:
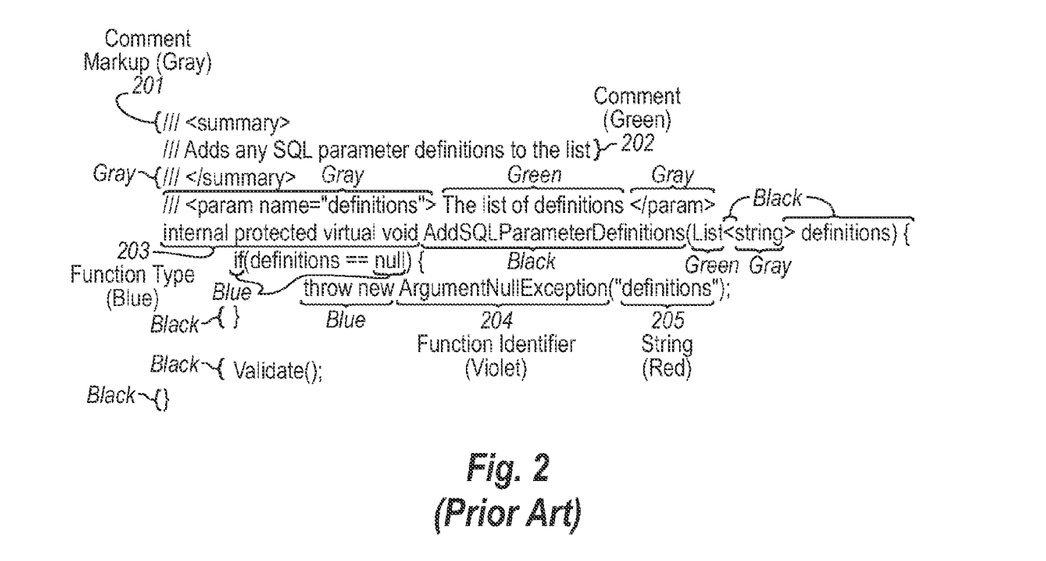
FIG. 2 (Prior Art) illustrates a method of coloring source code based on syntax.
Figure 6B:
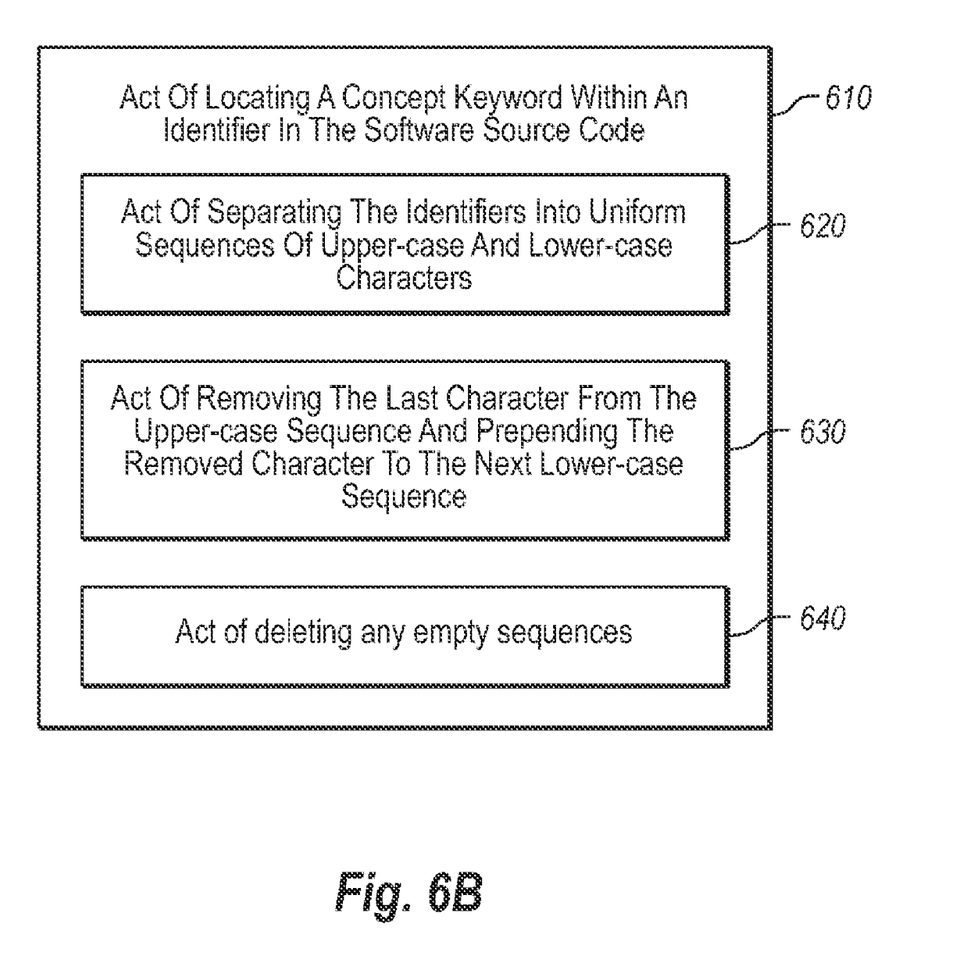
FIG. 6B illustrates a block diagram of an example method for decomposing an identifier into concept keywords.

FIG. 6B includes an act of locating a concept keyword within an identifier in the software source code (act 610). For example, concept keyword locating module 510 may locate a concept keyword (e.g., concept keyword 301, as illustrated in FIG. 3) within an identifier (e.g., function identifier 204, as illustrated in FIG. 2) in source code 501. In some cases, a function identifier, such as identifier 204, may include a plurality of concept keywords. For example, identifier 204 contains three concept keywords (i.e. concept keywords 305, 306 and 307). As explained above, concept keyword locating module 510 may be configured to pass a list of concept keywords 511 (e.g., concept keywords 305, 306 and 307) to identifier separating module 515. In some embodiments, act 610 may include multiple steps. For example, in some cases, locating a concept keyword within an identifier in the software source code may include acts 620, 630 and 640, as explained below.

FIG. 6B includes an act of separating the identifiers into uniform sequences of upper-case and lower-case characters (act 620). For example, identifier separating module 515 may separate one or more identifiers into uniform sequences of upper-case and lower-case characters (e.g., AddSQLParameterDefinitions becomes [A][dd][SQLP][arameter][D][efintions]). In some cases, identifier separating module 515 may be capable of separating identifiers into uniform sequences of all numeric, and/or all punctuation characters. As explained above, identifier separating module 515 may also be capable of forming a list of separated concept keywords 516 and passing list 516 to character removing module 520.

FIG. 6B includes, for each upper-case character sequence followed by a lower-case character sequence, an act of removing the last character from the upper-case sequence and prepending the removed character to the next lower-case sequence (act 630). For example, for each upper-case character sequence followed by a lower-case character sequence, character removing module 520 may remove the last character from the upper-case sequence and prepend the removed character to the next lower-case sequence (e.g. [ ][Add][SQL][Parameter][ ][Definitions]). Character removing module 520 may also be capable of forming a modified list of separated concept keywords 521 which includes the modified character sequence and passing list 521 to sequence deleting module 525

FIG. 6B includes an act of deleting any empty sequences (act 640). For example, sequence deleting module 525 may delete any empty character sequences. For instance, continuing the example above, sequence deleting module 525 may delete all empty sequences, resulting in e.g., [Add][SQL][Parameter][Definitions]. As explained above, sequence deleting module 525 may also be capable of forming a modified list of separated concept keywords 526 which includes the modified character sequence and passing modified list 526 to color value determining module 530. Thus, acts 610, 620, 630 and 640 illustrate one exemplary method for decomposing an identifier into one or more concept keywords.

Method 600 includes an act of an act of determining a numerical value for each concept keyword based on the sequence of characters included in each concept keyword (act 650). For example, color value determining module 530 may determine a numerical value for each concept keyword (e.g. concept keyword 301, as illustrated in FIG. 3) based on the sequence of characters included in each concept keyword. For instance, color value determining module 530 may use stemming module 528 (i.e., a stemming algorithm within stemming module 528) to determine whether any of the concept keywords have a substantially similar root form and determine a numerical value based on the concept keyword's root form (optional act 645).

Stemming algorithms can generally be described as algorithms that can be applied to character sequences (i.e. words) to determine similar root forms or stems in the words. For example, if a stemming algorithm were applied to the words "definition," "defines" and "definitional," the stemming algorithm would be able to determine a common root form of "define." Thus, in some embodiments, concept keyword colorizer 505 may assign the same or similar colors to words that share a substantially similar root form (e.g. see "change" and "changed" 406 both colored cyan in FIG. 4).

In some cases, the numerical value for each concept keyword may be determined using a hash function. Hash functions are algorithms that can be used to convert text strings or characters into numerical values, often employing some level of encryption. Thus, hash functions such as Message-Digest algorithm 5 (MD5), WHIRLPOOL, Secure Hash Algorithm (SHA), and RACE Integrity Primitives Evaluation Message Digest (RIPEMD) can be used to determine numerical values for concept keywords. In other embodiments, the numerical value for each concept keyword may be determined using knowledge of the overall vocabulary of the program to assign maximally different numerical values for consecutive concept keywords. This may assist the program developer in visually distinguishing between different consecutive concept keywords. As explained above, color value determining module 530 may also be capable of forming a list of concept keyword color values 531 and passing list 531 to color assigning module 535.

Method 600 includes an act of assigning a color to each concept keyword based on the numerical value determined for each concept keyword (act 660). For example, color assigning module 535 may assign a color to each concept keyword (e.g., concept keyword 301) based on the numerical value determined for each concept keyword. In some cases, the numerical value for each concept keyword is converted to a base-26 number. For example, a developer could take an accumulator variable set to zero and a factor variable set to 1/26 and then for each letter in the concept keyword perform three operations: 1) convert the letter to a letter value (e.g., 0.25), 2) increment the accumulator variable by the amount resulting from the letter value divided by the factor variable, and 3) divide the factor variable by 26. The resulting number thus becomes the basis for determining which color to assign to the concept keyword.

Figure 7:
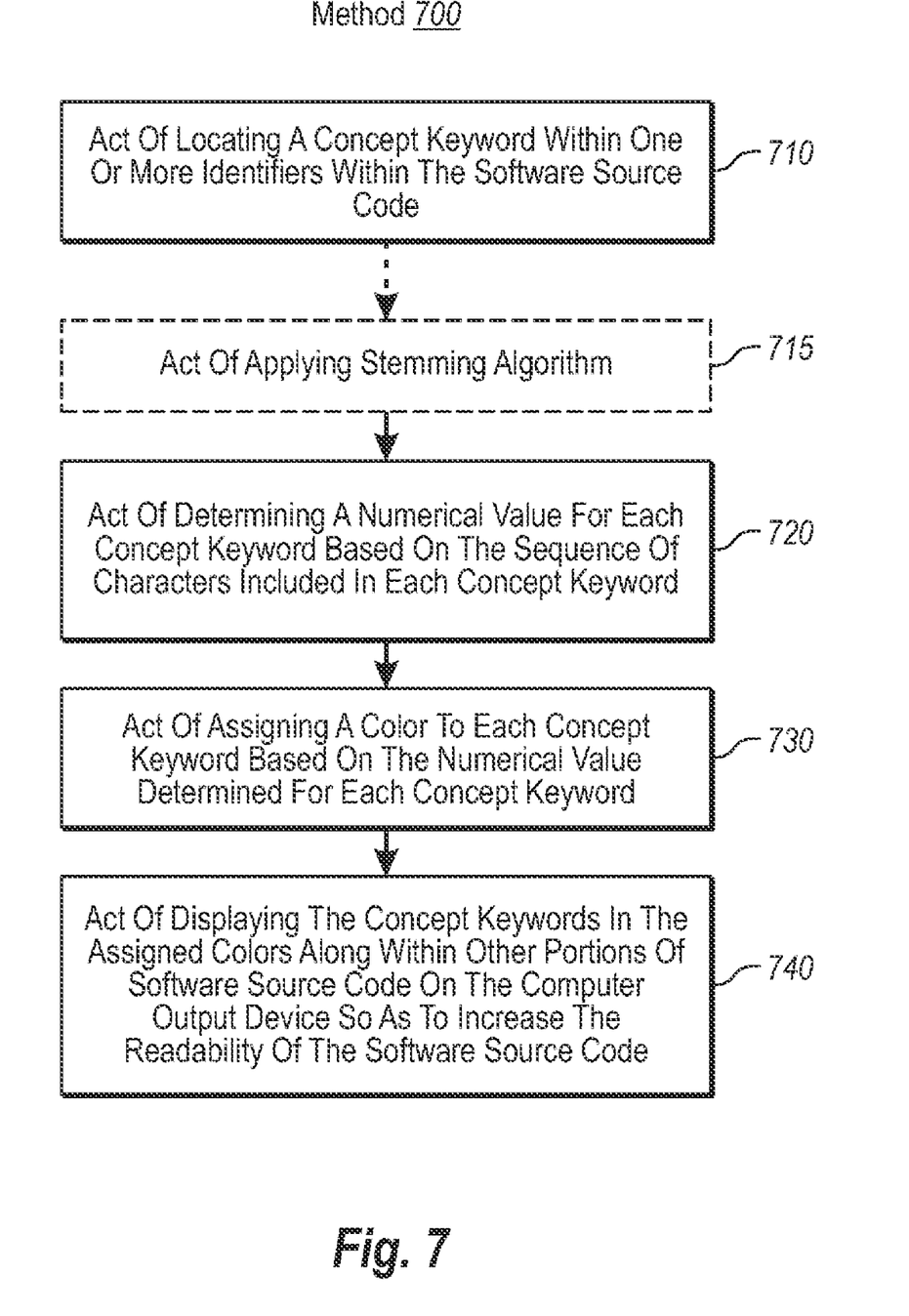
FIG. 7 illustrates a flowchart of an example method for colorizing and displaying concept keywords within program identifiers in source code.

FIG. 7 illustrates a flowchart of a method 700 for colorizing concept keywords within program identifiers in source code. As the method 700 may be performed in the context of the computer architecture 500 of FIG. 5, the method 700 of FIG. 7 will now be described with frequent reference to FIG. 5.

Method 700 includes an act of an act of locating a concept keyword within one or more identifiers within the software source code (act 710). For example, concept keyword locating module 510 may locate a concept keyword within one or more identifiers (e.g., function identifier 204) within software source code 501.

Method 700 includes an act of an act of determining a numerical value for each concept keyword based on the sequence of characters included in each concept keyword (act 720). For example, color value determining module 530 may determine a numerical value for each concept keyword (e.g. concept keyword 301, as illustrated in FIG. 3) based on the sequence of characters included in each concept keyword. For instance, color value determining module 530 may use a stemming algorithm within stemming module 528 to determine whether any of the concept keywords have a substantially similar root form and determine a numerical value based on the concept keyword's root form (optional act 715).

Stemming algorithms can generally be described as algorithms that can be applied to character sequences (i.e. words) to determine similar root forms or stems in the words. For example, if a stemming algorithm were applied to the words "definition," "defines" and "definitional," the stemming algorithm would be able to determine a common root form of "define." Thus, in some embodiments, concept keyword colorizer 505 may assign the same or similar colors to words that share a substantially similar root form (e.g. see "change" and "changed" 406 both colored cyan in FIG. 4).

In some cases, the numerical value for each concept keyword may be determined using a hash function. Hash functions are algorithms that can be used to convert text strings or characters into numerical values, often employing some level of encryption. Thus, hash functions such as Message-Digest algorithm 5 (MD5), WHIRLPOOL, Secure Hash Algorithm (SHA), and RACE Integrity Primitives Evaluation Message Digest (RIPEMD) can be used to determine numerical values for concept keywords. In other embodiments, the numerical value for each concept keyword may be determined using knowledge of the overall vocabulary of the program to assign maximally different numerical values for consecutive concept keywords. This may assist the program developer in visually distinguishing between different consecutive concept keywords. As explained above, color value determining module 530 may also be capable of forming a list of concept keyword color values 531 and passing list 531 to color assigning module 535.

Method 700 includes an act of an act of assigning a color to each concept keyword based on the numerical value determined for each concept keyword (act 730). For example, color assigning module 535 may assign a color to each concept keyword (e.g., concept keyword 301) based on the numerical value determined for each concept keyword. In some cases, the numerical value for each concept keyword is converted to a base-26 number. The color assigned to the concept keyword is then based on the base-26 number.

Method 700 includes an act of an act of displaying the concept keywords in the assigned colors within other portions of software source code on the computer output device so as to increase the readability of the software source code (act 740). For example, concept keywords (concept keywords 301-307, as illustrated in FIG. 3) may be displayed in the assigned colors within other portions of colorized source code 541 on display device 550 so as to increase the readability of the source code. In some embodiments, concept keywords may be displayed with a colored background behind the text, where the background color is the assigned color according to the determined numerical value and the text is white, black, or any other color which contrasts with the assigned color, in order to increase readability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor, system memory, and, a computer output device capable of displaying software source code, a method for colorizing concept keywords within identifiers in the source code, the method comprising:

an act of accessing a function identifier for a function, the function identifier using a string of a plurality of words to name the function within the source code, the function configured to receive one or more parameters and provide computing functionality based on the parameters, the function identifier used to reference the function by name such that other functions can use the function identifier to pass parameter values for the one or more parameters to the function to execute the provided computing functionality based on the parameter values;

an act of the processor decomposing the function identifier of the function into a plurality of concept keywords, each concept keyword including a sequence of characters and being one of the words in the string of words used to name the function;

an act of determining a numerical color value for each concept keyword based on the sequence of characters included in each concept keyword, the numerical color value representing a color in an identifier concept keyword coloring scheme; and an act of assigning the represented color from the identifier concept keyword coloring scheme to each concept keyword based on the numerical color value determined for each concept keyword, including assigning a first color to one concept keyword in the function identifier and assigning a second different color to another concept keyword in the function identifier such that at least two of the concept keywords in the function identifier are assigned different colors.

2. The method of claim 1, further comprising separating the identifiers into uniform sequences of numeric or punctuation characters.

3. The method of claim 1, wherein the numerical color value for each concept keyword is converted to a base-26 number.

4. The method of claim 1, wherein the numerical color value for each concept keyword is determined using a hash function.

5. The method of claim 4, wherein the hash function is Message-Digest algorithm 5 (MD5).

6. The method of claim 1, wherein the numerical color value for each concept keyword is determined using knowledge of the overall vocabulary of the program to assign maximally different numerical color values for consecutive concept keywords.

7. At a computer system including a processor, system memory, and, a computer display device capable of displaying source code, a method for displaying colorized concept keywords within program identifiers in the source code, the method comprising:

an act of locating a first concept keyword within a plurality of different types of program identifiers within the software source code, the program identifiers used to name program elements within the software source code such that the program identifiers can be used to reference the program elements within the software source code;

an act of locating a second concept keyword within a second plurality of the different types of program identifiers within the software source code;

an act of determining a numerical color value for the first concept keyword based on the sequence of characters included in the first concept keyword, the numerical color value representing a first color in an identifier concept keyword coloring scheme;

an act of determining a numerical color value for the second concept keyword based on the sequence of characters included in the second concept keyword, the numerical color value representing a second different color in the identifier concept keyword coloring scheme;

an act of assigning the first color to all instances of the first concept keyword included in any program identifier in the software source code based on the numerical value determined for the first concept keyword such that at least a portion of two different types of program identifiers are assigned the first color; and an act of assigning the second color to all instances of the second concept keyword included in any program identifier in the software source code based on the numerical value determined for the second concept keyword such that at least a portion of two different types of program identifiers are assigned the first color; and an act of the processor displaying the instances of the first and second concept keywords in the corresponding assigned colors within software source code on the computer display device such that each assigned color identifies a concept keyword across the plurality of different types of program identifiers.

8. The method of claim 7, wherein the concept keyword is displayed with a colored background behind the text.

9. The method of claim 7, wherein the numerical color value for each concept keyword is converted to a base-26 number.

10. The method of claim 7, wherein the numerical color value for each concept keyword is determined using a hash function.

11. The method of claim 7, wherein the numerical color value for concept keyword is determined using knowledge of the overall vocabulary of the program to assign maximally different numerical values for consecutive concept keywords.

12. A computer program product for use at a computer system, the computer program product for implementing a method for colorizing concept keywords within program identifiers in the source code, the computer program product comprising one or more computer storage media having thereon computer-executable instructions that, when executed by one or more processors of a computing system, cause the computing system to perform the following:

access a plurality of different types of program identifiers, each program identifier including a string of at least one word;

locate one or more concept keywords within each program identifier, the locating comprising:

separating the program identifier into uniform sequences of upper-case and lower-case characters;

for each upper-case character sequence followed by a lower-case character sequence, removing the last character from the upper-case sequence and prepending the removed character to the next lower-case sequence; and deleting any empty sequences;

determine a numerical color value for each located concept keyword based on the sequence of characters included in each located concept keyword, numerical color values representing colors in an concept keyword coloring scheme; and assign a color to each located concept keyword based on the numerical color value determined for each concept keyword, including assigning a first color to one concept keyword and assigning a second different color to another concept keyword in the such that at least two of the concept keywords are assigned different colors; and an act of displaying each located concept key word in its assigned color within the software source code on the computer display device such that the first and second assigned colors are used to represent the one and the other concept keyword respectively when the one and other concept keywords are used in any of the plurality of different types of program identifiers.

13. The computer program product of claim 12, wherein the numerical color value for each concept keyword is determined using a hash function.

* * * * *